United States Patent [19]

Friesen et al.

[11] Patent Number: 4,515,906
[45] Date of Patent: May 7, 1985

[54] ANISOTROPIC MICROPOROUS SUPPORTS IMPREGNATED WITH POLYMERIC ION-EXCHANGE MATERIALS

[75] Inventors: Dwayne Friesen; Walter C. Babcock; Mark Tuttle, all of Bend, Oreg.

[73] Assignee: Bend Research, Inc., Bend, Oreg.

[21] Appl. No.: 470,371

[22] Filed: Feb. 28, 1983

[51] Int. Cl.³ ............................................. C08D 5/20
[52] U.S. Cl. ...................................... 521/28; 521/27
[58] Field of Search ................................. 521/27, 28

[56] References Cited

U.S. PATENT DOCUMENTS 2,681,319 6/1954 Bodamer ............................... 521/28
3,375,208 3/1968 Dieddy .................................. 521/28
3,754,055 8/1973 Renbaum .............................. 521/30
3,991,017 11/1976 Baviett et al. ........................ 521/32
4,347,327 8/1982 Lee et al. .............................. 521/28

Primary Examiner—Joseph L. Schofer
Assistant Examiner—Peter F. Kulkosky
Attorney, Agent, or Firm—Chernoff, Vilhauer, McClung, Birdwell & Stenzel

[57] ABSTRACT

Novel ion-exchange media are disclosed, the media comprising polymeric anisotropic microporous supports containing polymeric ion-exchange or ion-complexing materials. The supports are anisotropic, having small exterior pores and larger interior pores, and are preferably in the form of beads, fibers and sheets.

7 Claims, 5 Drawing Figures

100 μm

100 μm

1

ANISOTROPIC MICROPOROUS SUPPORTS IMPREGNATED WITH POLYMERIC ION-EXCHANGE MATERIALS

The government has rights in this invention pursuant to Contract No. DE-AC06-79ER10738 awarded by the U.S. Department of Energy.

BACKGROUND OF THE INVENTION

There is currently a large research and development effort aimed at producing polymeric ion-exchange and ion-complexing materials (commonly known as ion-exchange materials) for a wide variety of applications. For the most part, these materials are resins comprising a cross-linked polymer (e.g., polystyrene crosslinked with divinylbenzene) that is substituted with an ion-exchange group either before or after polymerization. There are two major obstacles to the production of many different types of these resins with highly varied ion-exchange characteristics. First, the number of ion-exchange substituents that can be easily attached to reactive sites on the polymeric backbones of resins is limited. Secondly, only a limited number of polymers are available that exhibit suitable physical characteristics such as insolubility in water, resistance to abrasion, and resistance to osmotic swelling, and that also have chemically active sites for adding ion-exchange groups. For example, polytetrafluoethylene and polypropylene have such favorable physical characteristics but are chemically unreactive toward addition of ion-exchange groups.

There are many polymeric materials that exhibit desirable ion-exchange properties (e.g., high selectivity and high capacities to extract metal ions) but that are not structurally suited for use in ion-exchange processes. See, for example, *J. Poly. Sci.: Polym. Let. Ed.* 20(1982) 291 and *J. Chem Soc. Dalton* (1981)1486. Thus, it has been found that certain water-soluble polymers such as poly(vinylbenzocrownether)s and poly(vinylbenzoglyme)s are highly selective toward one metal ion over another, *J. Pure Appl. Chem.* 54(1982)2129. Other copolymers such as bicyclo[2.2.1]hept-5-ene-2,3-dicarboxylic anhydride with divinylbenzene and acrylic acid or acrylonitrile and p-vinylbenzoylacetone and acrylamide or maleic acid, all of which show poor abrasion resistance, are useful for separating $Ca^{+2}$, $Co^{+2}$, $Cu^{+2}$ from other metal ions and for separating $Cu^{+2}$ ions, *Plaste Kautsch* 29(1982)331, and for separating $Cu^{+2}$ from other transition metal ions, *J. Appl. Pol. Sci.* 27(1982)811.

There is thus a substantial need to exploit the favorable ion-exchange characteristics of such materials by incorporating them into media with favorable physical characteristics. To this end, in U.S. Pat. Nos. 4,014,798, 4,045,352 and 4,187,333 there is disclosed hollow-fiber ion-exchange membranes comprising structurally sound porous hollow fibers containing a polymeric ion-exchange material within the fiber pores. However, because the ion-exchange material was not held firmly within the particular porous structure it was lost upon flushing the support with water.

SUMMARY OF THE INVENTION

According to the present invention, there are provided novel ion-exchange media useful for highly efficient extraction of ions from aqueous solutions, the media comprising polymeric microporous supports, with an anisotropic pore structure of small pores at the surface and large pores in the interior, the large pores being filled with polymeric ion-exchange or ion-complexing materials, and the small pores being sufficiently small to retain the ion-exchange materials, thereby preventing their loss from the support. Preferred forms of the microporous supports are beads, sheets and fibers.

DETAILED DESCRIPTION OF THE INVENTION

The novel ion-exchange media of the present invention comprises two components. These components may be broadly described as (1) a polymeric anisotropic microporous support, and (2) a polymeric ion-exchange or ion-complexing material. The second component substantially fills the pores of the first component. Unlike the one-component ion-exchange materials of the prior art, the physical and chemical properties of each component can be varied independently. This allows both the physical and ion-complexing properties of the novel ion-exchange media of the present invention to be optimized. Thus, the present invention allows ion-exchange materials which are highly resistant to damage from heat, abrasion, or osmotic swelling to be made by using anisotropic microporous support materials made from tough thermoplastics such as polysulfone and polyvinylidene fluoride, while at the same time utilizing the high selectivity and high ion extraction capacity of polymeric ion-exchangers which otherwise lack the structural characteristics necessary to be useful as ion-exchangers. Unlike the two-component ion-exchange materials of the prior art, the microporous support of the present invention is anisotropic with surface pores that are sufficiently small to prevent loss of the ion-exchange material held within the larger internal pores.

The microporous supports may be in virtually any shape with an anistropic pore structure, having very small pores on the surface and relatively large pores in the interior. Preferred forms of the supports are beads, sheets and fibers with and without lumens, although any geometric shape will work. It is preferable to have surface pores less than 0.1 micron in diameter and interior pores of from about 2 to 200 microns in diameter.

Exemplary polymeric compounds from which the microporous supports of the present invention may be fabricated include polysulfone, polystyrene, polyvinylchloride, polyacetonitrile, polyamides, polyphenylene oxide, polyvinylacetate, polyetherimides, polyvinylidene fluoride and combinations thereof.

Figure 1:
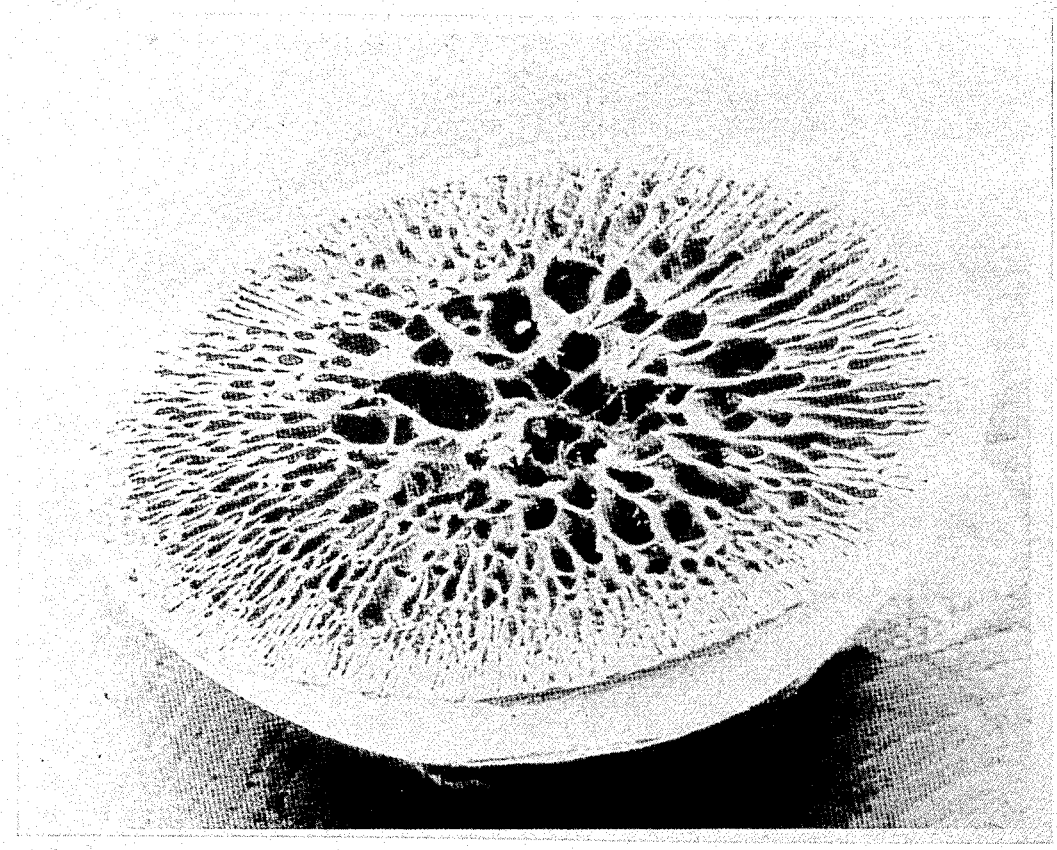
FIG. 1 is a cross-section photomicrograph of an anisotropic microporous support in bead form, useful in the present invention.

Anisotropic microporous bead supports of the present invention, as shown in FIG. 1, can be made by injecting droplets of a solution of the polymer through a stainless steel tube into a non-solvent bath where they are precipitated, the precipitation occurring more rapidly at the exterior surfaces than the interior, causing anisotropy with a graduation of pore sizes from very small (less than 0.1 micron) on the exterior to relatively large (20 to 200 microns) at the center. Bead size may be varied between about 1 to about 5 mm by varying the tube diameter. The preferred bead size is 2 to 3 mm in diameter. After precipitation, the beads may be washed with water and air-dried. Smaller beads with diameters from 0.001 to 1.0 mm can be made by substantially the same method, except that the polymer solution is dispersed into droplets 0.001 to 1.0 mm in diameter by use of a spray atomizer or by breaking a stream of polymer with an air jet and then allowing the droplets to fall into a water bath where the polymer precipitates.

Figure 2:
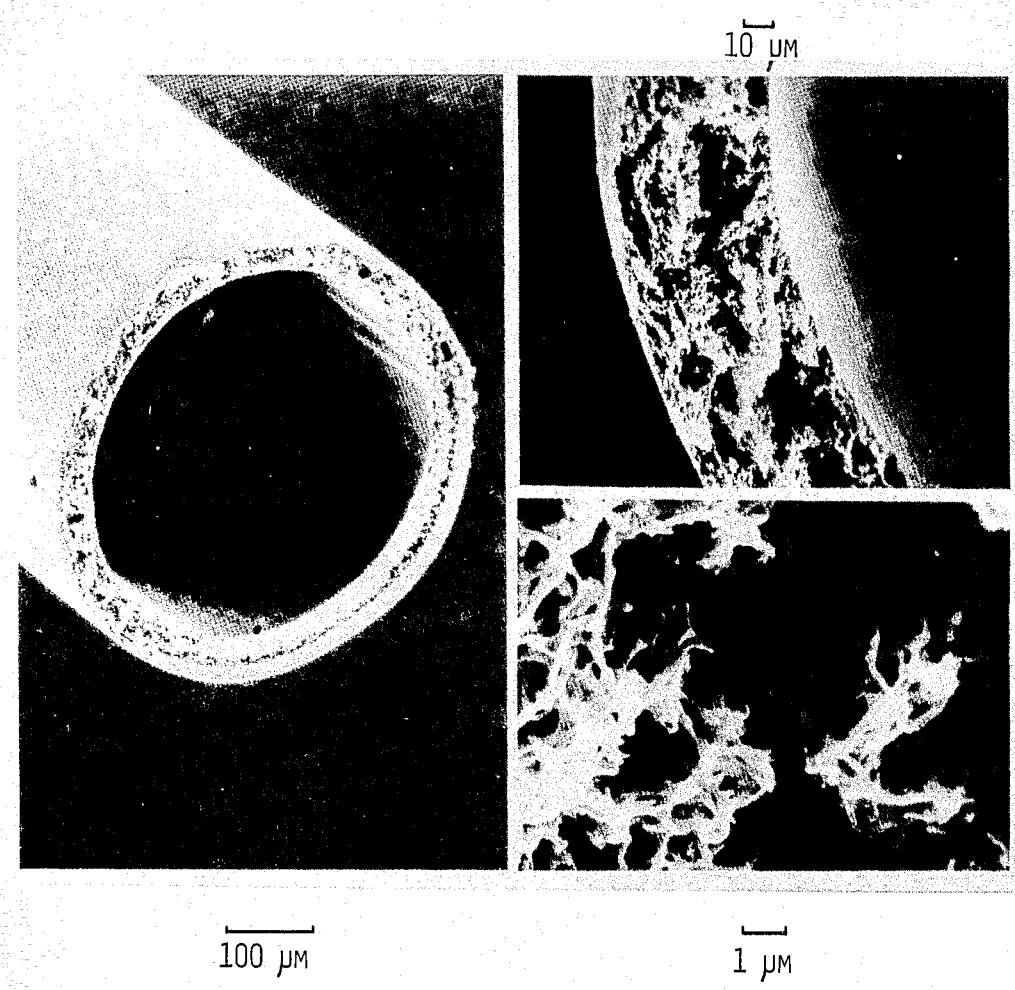
FIG. 2 contains three cross-section photomicrographs of different magnification of an anisotropic support similar to that shown in FIG. 1, but in lumen-containing or hollow fiber form.

Suitable anisotropic supports in the form of fibers with lumens, as shown in FIG. 2, are made by using the tubein-orifice solution spinning technique. This system utilizies a spinneret that consists of two concentric tubes; the annular space between the tubes is the polymer solution orifice and the inner tube is the lumen-forming orifice. In practice, the polymer solution is forced down the outside of the inner, lumen-forming tube and through the polymer solution orifice, while the lumen-forming solution of water (or water and solvent) flows from the inner orifice of the needle. The fiber falls through an air gap of up to 30 inches and collects in a water precipitation bath. A hollow fiber forms as the polysulfone precipitates from the polymer solution. The lumen-forming solution precipitates the inside fiber wall; air and then water precipitate the outside fiber wall. Precipitation occurs more rapidly on the surfaces of the hollow-fiber wall than on the interior, causing anisotropy with a graduation of pore sizes from very small (less than 0.1 micron on the exterior to relatively large pores (2 to 20 microns) on the interior. The fibers can have an outside diameter from about 0.2 to about 1.0 mm and an outside diameter of from about 0.10 to about 0.95 mm.

Figure 3:
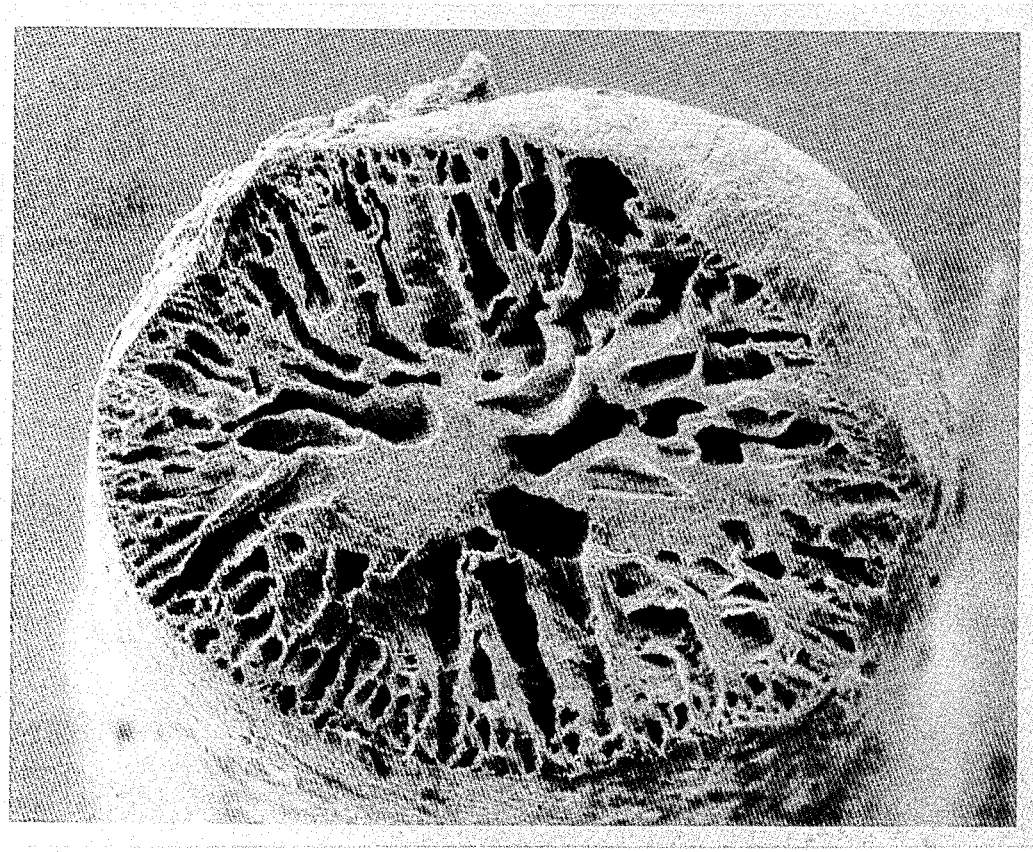
FIG. 3 is a cross-section photomicrograph of an anisotropic support in fiber form.

Anisotropic supports in the form of lumenless fibers, as shown in FIG. 3, are made by injecting a continuous stream of polymer solution through a stainless steel tube into a water bath under conditions substantially similar to those used to fabricate anisotropic beads, except that the tube is submerged in the water bath. Fibers thus formed have surface pores less than 0.1 micron in diameter and interior pores from about 5 to about 100 microns in diameter.

Flat sheets are made by conventionally practiced casting procedures used in the production of anisotropic microporous polymeric membranes, as disclosed, for example, in *Adv. Chem. Serv.* 38(1962)117, U.S. Pat. No. 3,651,024 and *Polym. Let.* 11(1973)102.

As previously mentioned, the present invention comprises the anisotropic microporous supports noted above, the pores of which are substantially filled with polymeric ion-exchange or ion-complexing materials. These are normally made by first loading the anisotropic microporous support with monomers or sufficiently low-molecular-weight prepolymers to permit introduction through the small surface pores. These monomers or prepolymers are selected to yield a polymeric ion-exchange or ion-complexing material under suitable reaction conditions. Polymerization within the support is then carried out. Once the polymer is formed in the support, it cannot escape through the small surface pores. Upon polymerization, the support with its polymeric ion-exchange material may be used for the extraction of metal ions from aqueous solutions. Even structurally weak gels and poorly crosslinked, non-crosslinked, or low molecular weight polymers, including those that are water-soluble can be used as ion-exchange material as long as the size of the polymer is sufficient to prevent its escape through the small surface pores of the support. This is an important aspect of the present invention, since it has been observed that highly selective ion-exchange materials can be made from structurally weak water-swelled gels, *J. Appl. Poly. Sci.* 27(1982)811, from polymers with low cross-link density, *J. Poly. Sci. Poly. Chem. Ed.*, 20(1982)1609, and from low molecular weight water-soluble polymers, *J. Pure Appl. Chem.*, 54(1982)2129.

Ion-exchange or ion-complexing monomers or low molecular weight prepolymers suitable for polymerization within the anisotropic microporous supports of the present invention include compounds containing the following functional groups: amides, amines, beta-diketones, hydroxyoximes, alkylphosphate esters, hydroxyquinolines, thiophosphate esters, carboxylic acids, and macrocyclic ethers. They also include alkyl-, aryl-, halogen-, and amino-substituted derivitives of such compounds and mixtures thereof. The monomers should also be chosen such that after polymerization the functional groups are available for ion complexation. Acceptable monomers or prepolymers also include those that have little or no ion-exchange or ion-complexing functionality but that develop this functionality during polymerization. Examples include aziridines and epoxides. In the case of aziridines, upon polymerization, tertiary amine ion-exchange sites are formed. In the case of epoxides, hydroxyl or ether ion-complexing sites are formed upon polymerization. The monomers must be chosen such that the resulting polymer is sufficiently hydrophilic to allow migration of the ionic species into the polymer.

Polymerization and crosslinking of the monomers within the support are normally accomplished by loading the microporous support, via the small surface pores, with a solution composed of monomers or prepolymers (about 10 wt % to about 99 wt %), solvent, and possibly a polymerization initiator (about 0.001 wt % to about 1.0 wt %). Loading may be accomplished by submerging the support in the monomer solution and drawing a vacuum of 5 mmHg or less, and then alternately releasing and applying the vacuum until the pores are substantially filled. Polymerization and crosslinking of the monomers take place by heating the monomer-filled support or by contact with external initiators.

Polymerization may also be initiated by thermal decomposition of an organic free-radical initiator. Suitable free-radical initiators include azo-nitriles and other azoderivatives, peroxides and peresters. Alternatively, polymerization and crosslinking can be carried out with reactive heterocyclic compounds that react by ring-opening ractions upon heat; examples include epoxide and aziridine derivatives.

EXAMPLE 1

Anisotropic microporous supports in bead form substantially as shown in FIG. 1 were prepared by injecting dropwise a solution of 120 g polysulfone in 1.0 L dimethylformamide through a stainless steel tube with an inside diameter of 0.75 mm through an air gap of 2 inches and into a bath of water at 20° C., thereby precipitating beads 2 to 3 mm in diameter with surface pores less than 0.1 micron in diameter and interior pores 100 to 200 microns in diameter. The beads were washed with water and allowed to air-dry.

EXAMPLE 2

Microporous polysulfone lumen-containing fibers substantially as shown in FIG. 2 having surface pores less than 0.1 micron in diameter, interior pores of 2 to 20 microns, an average diameter of 0.625 mm, and an internal diameter of 0.50 were prepared by using the tube-in-orifice solution spinning technique. This system utilizes a spinneret, which consists of two concentric tubes; the annular space between the tubes is the polymer-solution orifice and the inner tube is the lumen-forming orifice. A polymer solution composed of 175 g polysulfone and 200 g 2-methoxyethanol per liter of N,N-dimethylformamide (DMF) was forced down the outside of the inner, lumen-forming tube and through the polymer-solution orifice while a lumen-forming solution composed of 60 vol % DMF in water flowed through the lumen-forming tube. The two solutions fell through an air gap of 20 inches into a water precipitation bath at 20° C. The hollow fiber thus formed was rinsed with water to remove residual DMF and 2-methoxyethanol. The fibers were air-dried for 48 hours and were then ready for use.

EXAMPLE 3

Microporous polysulfone non-lumen-containing fibers substantially as shown in FIG. 3, having surface pores of less than 0.1 micron in diameter and interior pores 5 to 100 microns in diameter, were prepared by forcing a solution of 175 g polysulfone per liter of N,N-dimethylformamide (DMF) through a stainless steel tube 0.75 mm in diameter submerged in a water bath at 20° C. The polysulfone precipitated, forming a lumenless fiber as polymer solution contacted the water solution. The fibers thus formed were rinsed in water and air-dried.

EXAMPLE 4

Anisotropic microporous polysulfone fiber supports containing a polymeric hydrophilic methacrylate gel with pendant tertiary, amine groups were prepared by first immersing the fibers of Example 3 in a solution of 47.5 wt % N,N-dimethylaminomethacrylate, 2.5 wt % tetraethyleneglycoldimethacrylate and 0.25 wt % azo-bis-isobutylnitrile in methanol then alternately drawing a vacuum of about 5 mmHg and repressurizing to atmospheric pressure until the pores were substantially filled. The solution-filled fibers were subjected to a temperature of 65° C. for 75 minutes, substantial completion of the polymerization being indicated by the formation of a gel on the exterior of the fibers. The fibers were removed and the methanol solvent exchanged for water by soaking the fibers in water at 20° C. for 24 hours.

EXAMPLE 5

The metal-ion complexing capacity of the fibers of Example 4 was evaluated by contacting 0.85 g of the fibers with 1 L of an aqueous solution containing 10 ppm uranium as uranyl sulfate at pH 3.0 (pH adjusted by addition of sulfuric acid) at 25° C. After 16 hours the concentration of uranium in the aqueous solution was reduced to 3.2 ppm uranium. This corresponds to a uranium content of the fibers of 0.80 g of uranium per 100 g of fiber.

EXAMPLE 6

Anisotropic microporous polysulfone fiber supports containing a polymeric ion-exchange material were prepared by first immersing the fibers of Example 3 in a solution of 50 wt % polyethyleneimine (CORCAT P-18 sold by Cordova Chemical Company of Muskegon, Michigan) and 15 wt % epichlorohydrin in a 1:1 butanol-water mixture, then alternately drawing a vacuum of about 5 mmHg and repressurizing to atmospheric pressure until the pores were substantially filled. The solution-filled fibers were then subjected to a temperature of 60° C. for about 2 hours, substantial completion of the polymerization being indicated by gellation of the exterior solution. The fibers were removed from the gelled solution and the butanol solvent exchanged for water by soaking the fibers in water at 20° C. for 24 hours.

EXAMPLE 7

Figure 4:
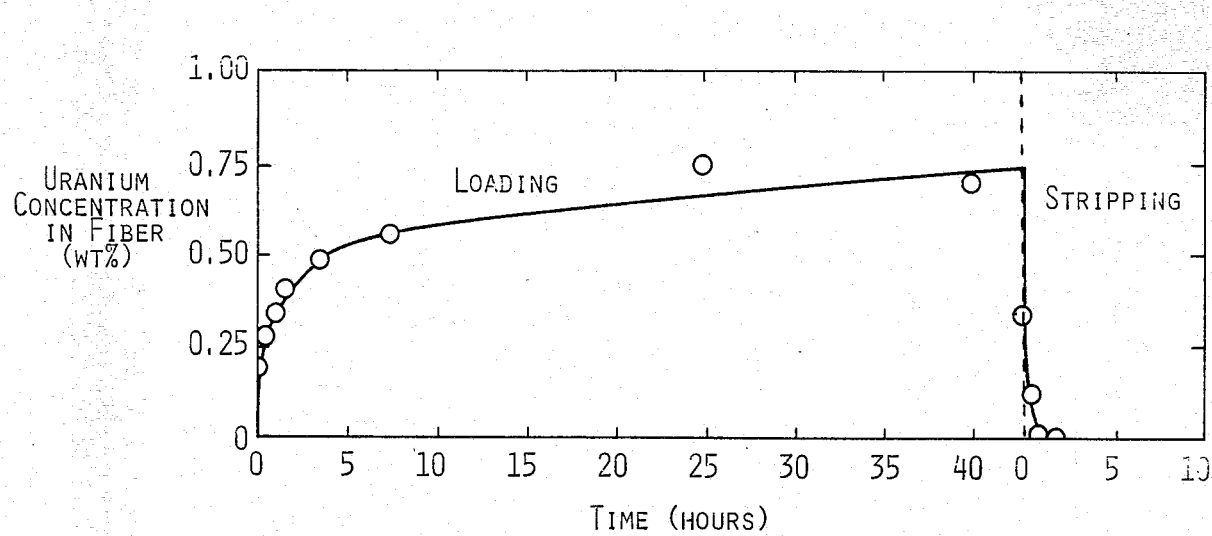
FIGS. 4 and 5 are graphs illustrating the extraction efficiency of the ion-exchange media of the present invention.

The ion-exchange capacity of the fibers of Example 6 was evaluated by cutting them into 10-cm-long bundles and contacting them with an aqueous feed solution comprising 10 ppm uranium as uranyl sulfate and 10-g/L sulfuric acid (pH 1.0). Extraction of uranium ion was complete after about 24 hours. Uranium was stripped from the fibers by transferring them to a 150-g/L sodium carbonate solution (pH 11.5), and stripping was complete in about 2 hours. The loading/stripping cycle is shown in FIG. 4. The maximum distribution coefficient, defined as the concentration of uranium ions in the fibers divided by the concentration of uranium ions in the aqueous feed solution, was approximately 750.

EXAMPLE 8

Figure 5:
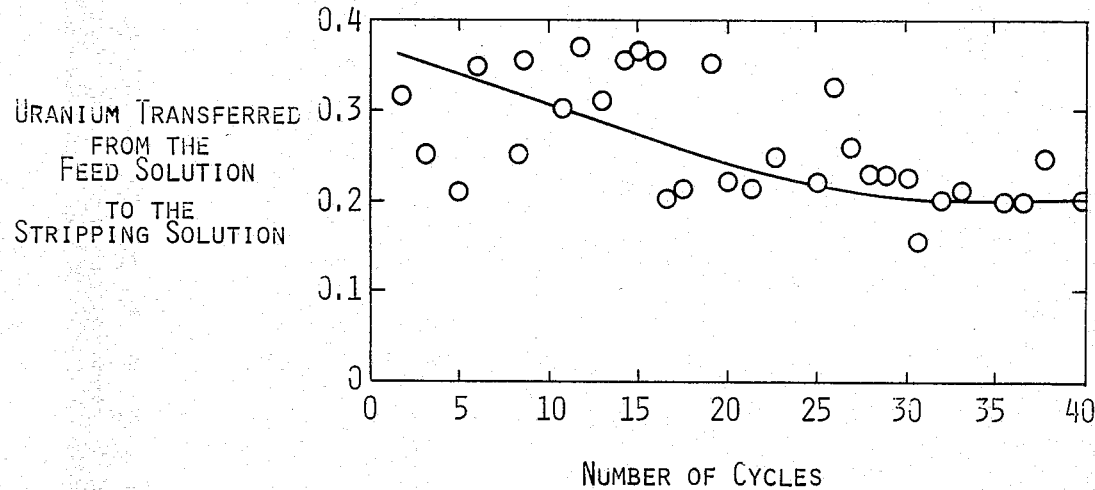

Fibers of Example 6 were tested over 40 loading/stripping cycles. During each loading/stripping cycle the fibers were contacted with an aqueous uranium feed solution comprising 10 ppm uranium as uranyl sulfate and 10-g/L sulfuric acid at pH 1.0 for 16 hours and then transferred to an aqueous stripping solution comprising 150-g/L sodium carbonate (pH 11.5) for 8 hours. The amount of uranium transferred from the feed solution to the stripping solution in wt % (defined as grams uranium per 100 grams fiber) is shown in FIG. 5 over 40 loading/stripping cycles. The results demonstrate that the fibers retain their ion-exchange characteristics over an extended period of operation.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

What is claimed is:

1. A composition of matter useful as ion-exchange media comprising a polymeric microporous support selected from the group consisting of polysulfones, polyvinylchlorides, polyacetonitriles, polyamides, polyphenylene oxides, polyvinylacetates, polyetherimides, polyvinylidene flourides, and derivatives and mixtures thereof, having an anisotropic pore structure of small pores of less than 0.1 micron in diameter at the surface and large pores of from about 2 to about 200 microns in diameter in the interior, said large pores containing a polymeric ion-exchange or ion-complexing material and said small pores being sufficiently small to substantially prevent loss of said ion-exchange or ion-complexing material from said support, said polymeric ion-exchange or ion-complexing material being formed from polymerizable compounds that, following polymerization, contain a functional group selected from amides, amines, beta-dietones, hydroxyoximes, alkylphosphate esters, hydroxyquinolines, thiophosphate esters, hydroxyls, ethers, carboxyls and macrocyclic ethers and amines and alkyl-, aryl-, halogen-, and amino-substituted derivatives and mixtures thereof.

2. The composition of claim 1 wherein the form of the anisotropic microporous support is selected from beads, fibers and sheets.

3. The composition of claim 1 wherein the anisotropic microporous support comprises beads having surface pores of less than 0.1 micron in diameter and interior pores from about 20 to 200 microns in diameter.

4. The composition of claim 1 wherein the anisotropic microporous support comprises lumen-containing fibers having surface pores less than 0.1 micron in diameter and interior pores about 2 to 20 microns in diameter.

5. The composition of claim 1 wherein the anisotropic microporous support comprises fibers without lumens having surface pores less than 0.1 micron in diameter and interior pores about 5 microns to about 100 microns in diameter.

6. The composition of claims 3, 4, or 5 wherein said beads or fibers are polysulfone.

7. A process for making the composition of claim 1 comprising:
 (a) introducing said ion-exchange or ion-complexing material into said support through said small surface pores as a monomer or mow molecular weight prepolymer; and
 (b) polymerizing said monomer or low molecular weight prepolymer in situ.

* * * * *

UNITED STATES PATENT AND TRADEMARK OFFICE
CERTIFICATE OF CORRECTION

PATENT NO. : 4,515,906

DATED : May 7, 1985

INVENTOR(S) : Dwayne Friesen, et al.

It is certified that error appears in the above-identified patent and that said Letters Patent is hereby corrected as shown below:

Column 8, Line 17        Change "mow" to --low--

Signed and Sealed this

Thirteenth Day of May 1986

[SEAL]

Attest:

DONALD J. QUIGG

Attesting Officer    Commissioner of Patents and Trademarks